Figure 1:
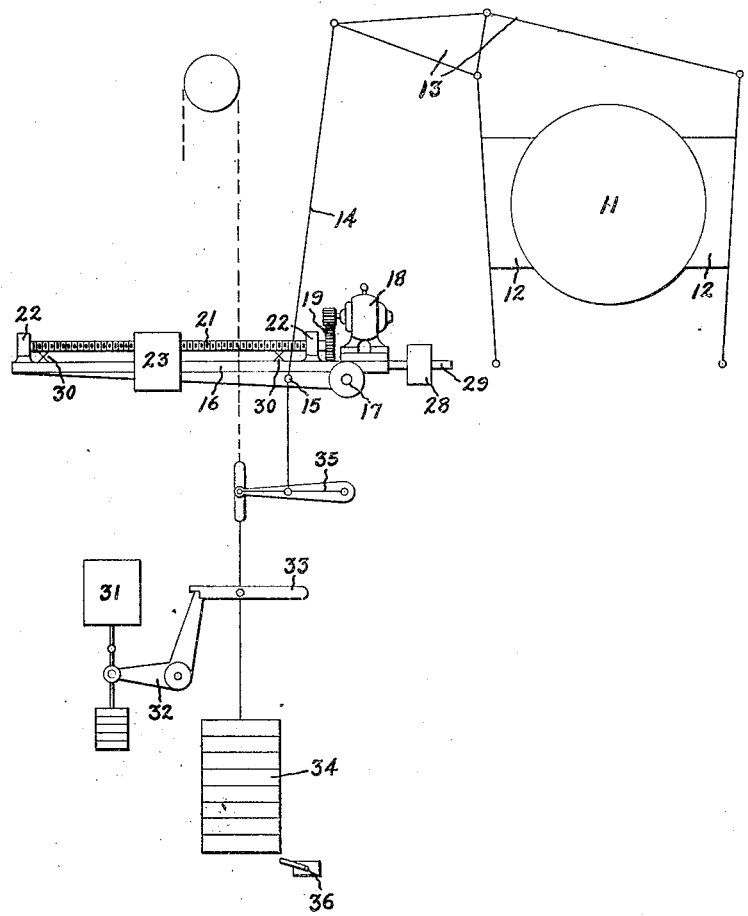

Patented July 21, 1931

1,815,857

UNITED STATES PATENT OFFICE

HUGH W. C. LIDDIARD, OF RUGBY, ENGLAND, ASSIGNOR TO GENERAL ELECTRIC COMPANY, A CORPORATION OF NEW YORK

SYSTEM OF ELECTRIC CONTROL

Application filed August 31, 1927, Serial No. 216,721, and in Great Britain September 10, 1926.

This invention relates to electric devices for controlling the rotation or movement of a motor or equivalent device or the position of a movable member in accordance with the position of a control handle. When applied to the control of an electric induction or other motor, the control means preferably operates on the field or other circuits of the motor. When the position of a member is to be controlled the same is preferably arranged to be driven backwards or forwards in any suitable way by a motor or equivalent device.

According to the invention a pair of electric relay devices, such as a pair of electromagnetic switches, is arranged to effect the rotation or movement of a member, which may be a motor or driven by a motor, in one direction when one of the relay devices is energized and the other deenergized, and in the reverse direction when the said one is de-energized and the said other energized, or when both are de-energized. This arrangement has the advantage that, should the control means become de-energized through a fault or supply failure in the controlling circuits, the member to be controlled will then be driven in a predetermined direction. Moreover, the arrangement of the relay devices is such that the stopping of the member is effected when both relay devices are energized simultaneously.

In an arrangement according to the invention for remotely controlling the position of a member to be driven in either of two directions by an electric motor according as to its direction of rotation, an electric controller operates on a pair of relay devices acting on the circuits of the motor to control its rotation, and the arrangement is such that the coils of the relay devices are energized at the same time and thus effect the stopping of the motor only when the said member is in a position corresponding to that of the controller handle, whilst for other positions of the controller handle the motor is driven in a predetermined direction when the coil of one relay device is energized and that of the other de-energized and in the reverse dirction when the one is de-energized and the other energized, or when both coils are de-energized.

Owing to the fact that in the event of both coils being de-energized at the same time the controlled member is moved in a predetermined direction, an arrangement according to the invention is particularly applicable for controlling the operating mechanism of brakes as in the event of a fault occurring in the control circuits the controlled member will be driven in a predetermined direction which can be arranged to be the one necessary to apply the brake. The invention is primarily designed to control operating mechanisms suitable for remotely controlling a brake, according to my prior application for United States Patent, Serial No. 204,785, filed July 11, 1927, according to which a pivoted lever is connected at one point with the means to be operated, for instance, a brake, and at another point to biasing means, for instance, a spring or a weight, means being provided for moving one of the connection points along the lever, or the pivoting point with respect to the lever, in order to vary the effect of the bias on the means to be operated. When applied to such an arrangement as this, the invention further comprises electric control means including a pair of relay devices controlling the operation of means for moving said point of application, or said pivoting point, the relay devices being arranged so that when both are de-energized, or when one is energized and the other de-energized, said point is moved in a direction to apply the brake; when said one is de-energized and said other energized, said point is moved in a direction to release the brake; and when both are energized at the same time, the said point is stationary.

Figure 2:
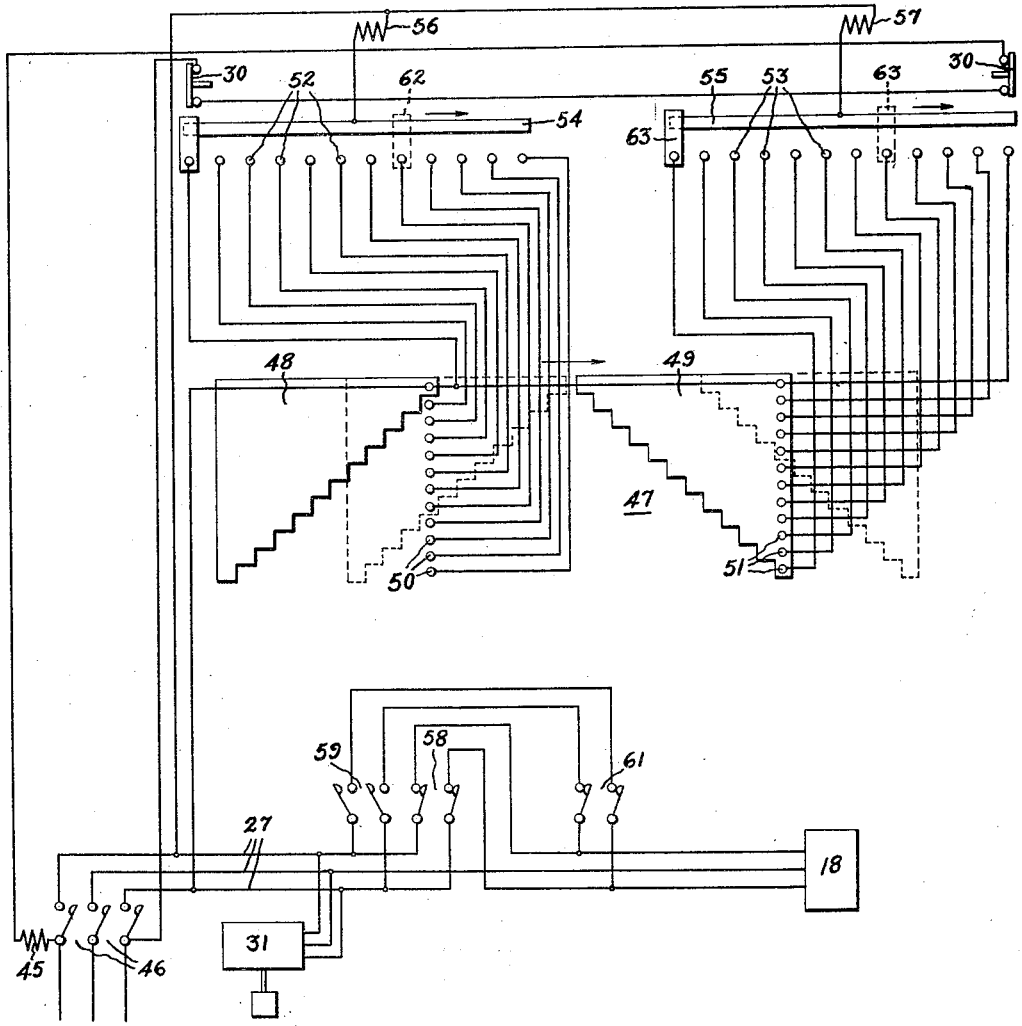

In the accompanying drawings, Fig. 1 represents diagrammatically the brake control mechanism of my said prior application, and Fig. 2 is a simple diagram representing the invention of my present application.

In the diagram hereof the motor 18, which is shown as an induction motor driven from the three-phase circuit 27, and the brake solenoid 31, correspond to the similarly-designated members in the arrangement of Fig. 1; so also do the limit switches 30, but these are now arranged in series with the contactor coil 45 which controls the contact switch 46 in the three-phase circuit 27.

Referring to the drawings, wherein like reference numerals are used, as far as possible, to denote similar parts, and particularly to Fig. 1, there is shown a rotatable brake-wheel or drum 11, having externally contracting brake-shoes 12 operating against its periphery, the brake-shoes being applied to produce a braking effort through the system of levers 13 when the rod 14 is pulled downwardly. The brake shoes are released in any suitable manner, as by means of an electromagnet (not shown). The rod 14 is connected at its lower end at 15 to the lever 16, shown pivoted at 17. Mounted on the pivoted lever 16 is an electric motor 18, connected by gearing 19 with the rotatable screw 21 carried in bearings 22 on the pivoted lever 16. This screw is adapted to engage with a nut in the weight 23, which is slidable along the pivoted lever 16 in either direction according as to the direction of rotation of the screw 21.

When the weight 23 is moved to the right (that is, toward the pivoting point 17) to a predetermined position, it just balances the motor 18 and a counter-weight 28, arranged on an extended portion 29 of the pivoted lever, the braking effort of the shoes 12 being nil or a minimum in this position of the weight 23. Movement of the weight 23 to the left increases the braking effort of the brake-shoes 12 to an extent depending on the position of the weight by tending to rotate the pivoted lever 16 counterclockwise and thus tending to pull down operating rod 14. It will be seen that the pull exerted on the rod 14 by the weight 23 during the movement of the brake-shoes 12 to their applied position varies from the minimum to the maximum value when the lever 16 rotates counterclockwise to the position shown in Fig. 1.

In order to prevent the "over-running" of the weight 23, limit-switches, indicated diagrammatically at 30, may be provided at both ends of the path of travel of the weight 23. These limit-switches preferably operate in the control circuits, as indicated in Fig. 2, though they may be arranged in other ways to effect the opening of the circuit for the motor 18.

In order that such a scheme shall be satisfactory in practice, it is essential to allow for cases in which the supply of power, either in the controlling circuits, or in the circuits of the electric motor, should fail. In order to deal with this situation, there is shown in Figs. 1 and 2 a brake-solenoid 31, which is energized from the mains 27, and which normally retains the pivoted bell-crank 32 with its end engaging the end of the catch 33. Suspended from the catch 33 is a weight 34, and the catch 33 is also connected by means of the pivoted lever 35 with the pivoted lever 16, and therefore with the rod 14. In the event of a failure of supply in the mains 27, the brake-solenoid 31 becomes de-energized, and the bell-crank 32 rotating anti-clockwise disengages from the catch 33, allowing the weight 34 to apply the brake to the drum 11.

If the main machine with which the brake-drum 11 is associated is adapted to be electrically driven, and is supplied from a source different from that for the motor 18, it is essential to ensure that, in the event of the brake being applied to the drum 11 due to failure of supply to the motor 18, the circuit for this main machine shall be opened. To provide for this, there is shown in Fig. 1 a tripping device 36 operable by the falling of weight 34, which can be arranged in any suitable way (as, for instance, by means of a relay) to effect the opening of the circuit for the main machine.

In Fig. 2 the brake-solenoid 31 is shown connected directly to the supply circuit 27. If the control circuits through control switch 47 were energized from a source different from 27, it would obviously be necessary to effect connections so that, in the event of failure of supply in the control circuit, the brake-solenoid 31 would operate in this case also. Furthermore, if a short-circuit or earthfault should occur on the control circuits, the fuse or other protective device should be arranged so as to cut off powder to the brake-solenoid 31 in order to trip the same.

The controller 47 comprises contact blocks 48 and 49 which are movable in unison, by the operation of the controller handle, relatively to the contact studs 50 and 51, respectively. These contact studs are electrically connected with other sets of fixed studs 52 and 53, respectively, mounted on the pivoted lever 16 (not shown) adjacent and parallel to one another. With each set of contact studs 52 and 53 is arranged a contact bar 54 and 55, to which are connected the coils 56 and 57 of relay devices or contactors having groups of contacts. The contacts of the contactor carrying coil 56 are designated 58 and 59, and those of the relay device carrying coil 57 are designated 61. Contacts 58, 59 and 61 are arranged to occupy the positions illustrated when both coils are de-energized; that is, contacts 59 are open and contacts 58 and 61 are closed.

It will be noted that these contacts operate on the circuit 27 of the induction motor 18 in such a way that, when both coils 56 and 57 are de-energized a circuit is completed for the motor in one sense through contacts 58, and that the same circuit will still be completed when coil 57 is energized and corresponding contacts 61 are open. If both relays are energized, however, the circuit for the motor is open at contacts 58 and at contacts 61, although contacts 59 are closed. If coil 56 is energized and coil 57 de-energized then the circuit for the motor is completed through contacts 59 and contacts 61 and is in the reverse sense to the previously described circuit.

62 and 63 represent contact devices arranged to engage with the contact bars 54 and 55 and sets of contact studs 52 and 53, respectively. The contact devices 62 and 63 are movable in unison and are adapted to take up positions corresponding to that of the weight 23 (not shown), i. e., positions dependent upon the operation of the motor 18.

The operation of this arrangement is as follows: With the controller sections 48 and 49 and the contact devices 62 and 63 in the positions shown by full lines, the switch 46 will be closed and both relays 56 and 57 are energized. The motor will therefore not be energized.

In this position of the contact devices 62 and 63 the brake is assumed to be applied to its maximum extent. Movement of the controller handle in a direction to release the brake moves the contact blocks 48 and 49 to the right relative to the contact studs 50 and 51 as indicated by the arrow, and the dotted lines on the drawings illustrate the position of the controller sections 48, 49 when moved to their 8th position from "full-brake" in a release direction. If the controller sections 48 and 49 are moved to this position, contactor coil 56, it will be noted is still energized, but the circuit for contact coil 57 is no longer completed. The circuit for the motor 18 is therefore completed through contacts 59 and 61 in such sense as to cause the motor to rotate in a direction which will move the weight so as to release the brake, thus moving the contact devices 62 and 63 to the right, as indicated by the arrows. When these contact devices land on the 8th from the left contact stud of the sets 52 and 53 a circuit is then completed for the contactor coil 57, and, as relay 56 is still energized, the motor is stopped. The position of the weight 23 and consequently the braking effect will then correspond to the position of the handle of the controller 47.

Movement of the controller handle in the reverse direction, i. e., to move the blocks 48 and 49 to the left, will then cause the energization of contactor coil 57 and the de-energization of contactor coil 56, with the consequent operation of the motor in the reverse direction to apply the brake until again the contact devices 62 and 63 have adopted positions on the sets of contact studs 52, 53 corresponding to that of the controller handle.

Furthermore, failure of supply in the control circuits, by leaving the relays 56 and 57 de-energized, will cause the operation of the motor 18 in a direction to apply the brake until the control devices 62, 63 operate the left-hand limit switch 30 thus opening the circuit through the motor at switch 46. On the other hand, if the supply to the motor should also have failed, then the brake solenoid 31 will operate in the manner described to apply the brake.

What I claim as new and desire to secure by Letters Patent of the United States, is:

1. In a system of electric control, a motor, a member operated thereby in either a forward or a reverse direction, a pair of electroresponsive devices for controlling the direction of operation of said motor, and electrical connections through which a selective energization of said devices is had and through which said motor is controlled such that when one of said devices is energized and the other de-energized, the motor is caused to operate in one direction and in the reverse direction when said other device is energized and the one de-energized, the said connections being such that said motor is stopped when both said devices are energized and the member is returned by the motor to a predetermined position when both said devices are deenergized.

2. In a system of electrical control, a motor, a member operated thereby in either a forward or a reverse direction, a pair of electroresponsive devices for controlling the direction of operation of said motor, and preselective control means electrically connected to effect a selective energization of said devices whereby said motor is controlled such that when one of said devices is energized and the other deenergized, the motor is caused to operate in one direction and in the reverse direction when said other device is energized and the other one deenergized, the said connections being such that said motor is stopped when both said devices are energized and the member is returned by said motor to a predetermined position when both of said devices are deenergized.

3. In a system of electrical control, a motor, a member operated thereby in either a forward or a reverse direction, a pair of electroresponsive devices for controlling the direction of operation of said motor, means electrically connected with said electroresponsive devices for effecting a selective or simultaneous energization of said devices, and connections between said electroresponsive devices and said motor whereby said motor is controlled to operate in one direction upon the energization of one of said devices, to operate in the same direction upon the de-energization of both of said devices, to operate in the reverse direction upon the energization of the other of said devices, and to stop upon energization of both of said devices.

4. In a system of electrical control, an electric motor, a member operated thereby in either the forward or the reverse direction in dependence on the direction of operation of the motor, a pair of electromagnetic switches connected to control the direction of operation of said motor including connections whereby when both of said switches are energized said motor is deenergized, a multi-position controller electrically connected with said switches and movable in one or the other of two directions to energize either one or the other of said switches in dependence upon the direction of operation of said controller whereby the motor is operated in one direction or the other to drive said member, control means operated by said member for energizing the remaining switch to stop the motor when said member arrives at a position corresponding to the position of said controller, the said connections being such that the member is returned by said motor to a predetermined position when both of said switches are deenergized.

5. In a system of electrical control, an electric motor, a member operated thereby in either the forward or the reverse direction in dependence upon the direction of operation of the motor, a pair of electromagnetic switches connected to respectively effect the control of said motor for forward and reverse operation including connections for said switches arranged so that when both of said switches are energized said switches are actuated to positions to effect the deenergization of the motor circuit, a multi-position controller electrically connected with said switches and movable in one or the other of two directions to energize one or the other of said switches in dependence upon the direction of operation of said controller whereby the motor is energized to operate in one direction or the other to drive said member and control means operated by said member for energizing the remaining one of said switches to stop the motor when said member arrives at a position corresponding to the position of said controller.

6. In a system of electrical control, an electric motor, a member operated thereby, a pair of switches each having a normal position and a second position to which it may be operated, connections for said switches whereby said switches control the starting and stopping of said motor for forward and reverse operation, including connections arranged so that the concurrent operation of both of said switches to their second positions deenergizes said motor, means for selectively operating one of said switches to its second position whereby the motor is operated in one direction or the other to drive said member and means controlled by said member for operating the remaining switch to deenergize said motor.

In witness whereof, I have hereto set my hand this eighth day of August, 1927.

HUGH W. C. LIDDIARD.